United States Patent [19]

Rees et al.

[11] 4,331,380
[45] May 25, 1982

[54] GRADIENT INDEX LENS ARRAY HAVING REDUCTION PROPERTIES

[75] Inventors: James D. Rees, Pittsford; David B. Kay, Rochester; William L. Lama, Webster, all of N.Y.

[73] Assignee: Xerox Corporation, Stamford, Conn.

[21] Appl. No.: 151,994

[22] Filed: May 21, 1980

[51] Int. Cl.³ .................................................. G02B 5/16
[52] U.S. Cl. .................... 350/96.25; 350/413; 350/417; 350/96.31; 355/1
[58] Field of Search ............. 350/96.18, 96.24, 96.25, 350/96.26, 96.27, 96.31, 413, 417; 355/1

[56] References Cited

U.S. PATENT DOCUMENTS

| | | | |
|---|---|---|---|
| 3,658,407 | 4/1972 | Kitano et al. | 350/96.25 |
| 3,922,062 | 11/1975 | Uchida | 350/96.12 |
| 3,947,106 | 3/1976 | Hamaguchi et al. | 355/1 |
| 3,977,777 | 8/1976 | Tanaka et al. | 355/1 |
| 4,168,900 | 9/1979 | Adachi | 355/1 |
| 4,189,207 | 2/1980 | Fisher et al. | 350/96.25 |
| 4,258,978 | 3/1981 | Cole | 350/96.25 |
| 4,264,130 | 4/1981 | Ogura | 350/96.25 |

OTHER PUBLICATIONS

Lindberg, "Fiber Optic Magnifier", *IBM Tech. Discl. Bulletin*, vol. 9, No. 12, May 1967, pp. 1751–1752.
Kapron, "Geometrical Optics of Parabolic Index-Gradient Cylindrical Lenses", *J.O.S.A.*, vol. 60, No. 11, Nov. 1970, pp. 1433–1436.
Moore, "Gradient-Index Optics: A Review", *Applied Optics*, vol. 19, No. 7, Apr. 1980, pp. 1035–1038.
Rees et al, "Some Radiometric Properties of Gradient-Index Fiber Lenses", *Applied Optics*, vol. 19, No. 7, Apr. 1980, pp. 1065–1069.

*Primary Examiner*—John D. Lee

[57] ABSTRACT

A gradient index lens array is provided with reduction and enlargement capabilities. Gradient index fibers are arranged in single row or double row (bundled) configuration with fibers increasingly departing from the perpendicular condition at the center of the array relative to object and image planes in a characteristic fan-like manner. Fiber lengths are adjusted to compensate for changes in total conjugate which occur because of the progressive tilting of the axes of the individual fiber lenses. This is achieved, in one embodiment, by grinding the faces of a lens array into a convex configuration.

24 Claims, 18 Drawing Figures

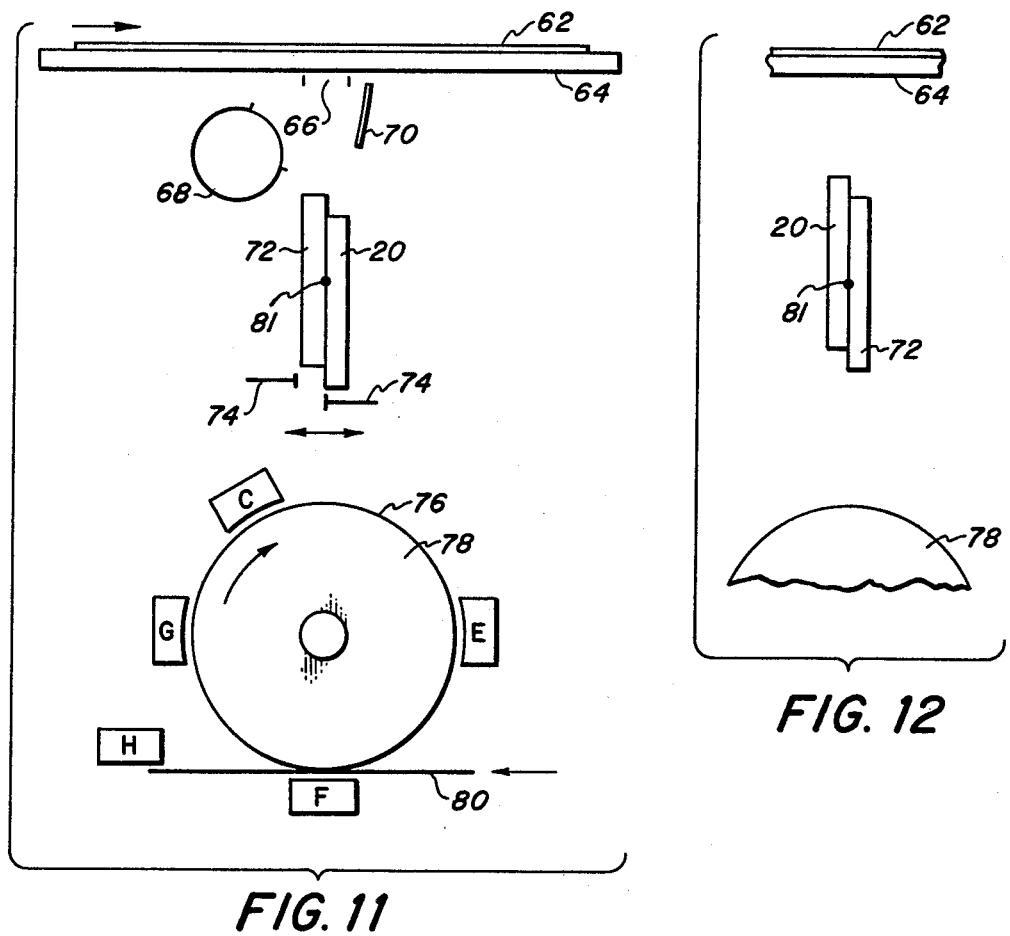
*FIG. 11*
*FIG. 12*
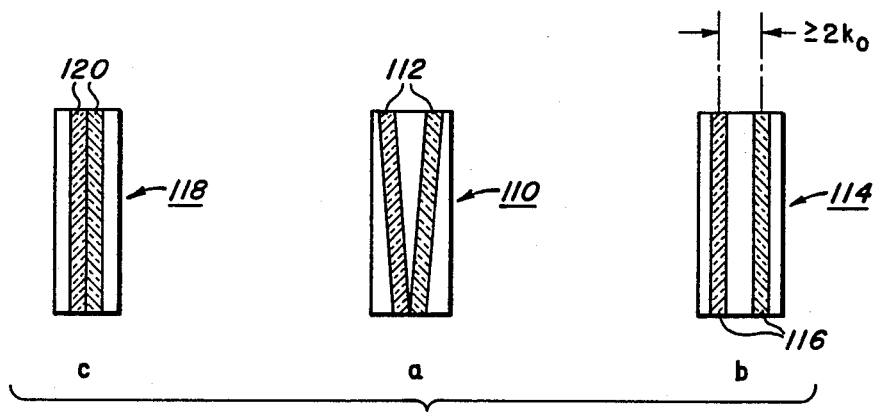
*FIG. 14*

GRADIENT INDEX LENS ARRAY HAVING REDUCTION PROPERTIES

BACKGROUND AND PRIOR ART STATEMENT

The present invention relates to gradient index optical fibers and, more particularly, to a bundled array of such fibers forming a lens array which transmits an image of an object at an object plane to an image plane at a magnification other than unity.

Image transmitters comprising bundled gradient index optical fibers are known in the art. U.S. Pat. No. 3,658,407 describes a light conducting fiber made of glass or synthetic resin which has a refractive index distribution in a cross section thereof that varies parabolically outward from a center portion thereof. Each fiber acts as a focusing lens to transmit part of an image of an object placed near one end. An assembly of fibers, in a staggered two-row array, transmit and focus an image of the object. The fiber lenses are produced under the trade name "SELFOC"; the mark is registered in Japan and owned by Nippon Sheet Glass Co., Ltd.

Numerous techniques are known in the art for manufacturing glass or plastic fibers with index-of-refraction variations. These are usefully summarized in an article entitled "Gradient Index Optics: A Review" by Duncan T. Moore, Applied Optics, 1 April 1980, Volume 19, No. 7, pp. 1035–1038.

Gradient index lens arrays have found use in a number of technologies; e.g. in construction of printed type optical circuits as disclosed in U.S. Pat. No. 3,922,062 and as a replacement for conventional optical systems in copiers as disclosed in U.S. Pat. Nos. 3,947,106 and 3,977,777.

Heretofore, gradient index lens arrays have been used to transmit images at a magnification of 1:1. A theoretical exploration of achieving differing magnifications with a single gradient index lens is disclosed by Felix P. Kapron in an article in the Journal of the Optical Society of America (Vol. 60, Number 11, November 1970). However, the problem of assembling hundreds of fibers in a lens array which would provide a reduced or enlarged image has not been achieved. The advantages of, for example, a gradient index lens array which transmits images at reduced magnifications are obvious in applications such as a reduction or enlargement copier.

SUMMARY

It is, therefore, the principal object of this invention to provide a gradient index lens array capable of transmitting an image at magnifications other than unity. It is a further object to utilize such a lens array or series of lens arrays, in conjunction with a unity magnification lens array in the optical system of a multi-magnification copier. These results are achieved by assembling a plurality of gradient index optical fibers into a lens array, the fibers at the center of the array being substantially perpendicular to an object and image plane while adjoining fibers are progressively tilted in fan-like fashion towards the ends of the array so that their axes increasingly depart from the substantially perpendicular orientation.

DRAWINGS

FIG. 11 is a schematic end view of a reduction copier utilizing a reduction gradient index lens array assembled with a unity magnification lens array.

FIG. 12 shows the lens array assembly of FIG. 11 rotated to obtain enlargement.

FIGS. 14a, b, and c illlustrate possible double-row lens array configurations.

DESCRIPTION

Figure 1:
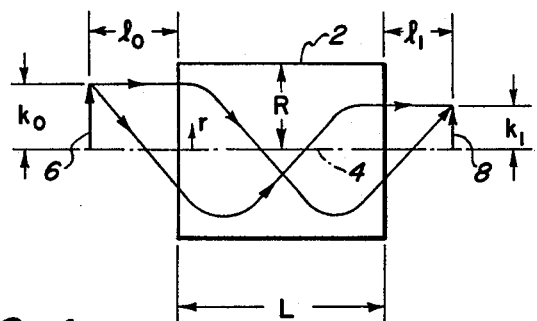
FIG. 1 illustrates a single gradient index fiber transmitting an image at a reduced magnification.

The relationship between an object and its image as transmitted through a prior art single gradient index fiber is shown in FIG. 1. Fiber 2 has an index of refraction which varies radially with distance r from the optical axis 4. In conventional gradient index imaging fibers the index of refraction n(r) varies quadratically with distance r from the optical axis:

$$n(r) = n_0(1 - Ar^2/2) \qquad (1)$$

where $n_0$ is the index on the fiber axis 4, and A is a positive constant. Typically $A = 0.016$ mm$^{-2}$ and the fiber radius $R = 0.5$ mm. Object 6 is illuminated in a manner not shown and reflected light progresses through the interior of fiber 2 in a sinusoidal ray path.

FIG. 1 illustrates the formation of an erect, real image which is required for image formation with an array lens. For a fiber of any given length L in the range $$\pi/\sqrt{A} \leq L \leq 2\pi/\sqrt{A} \qquad (2)$$

an erect image 8 will be produced at a distance $l_1$ from the fiber exit face, of an object (or portion of an object) 6 a distance $l_0$ from the fiber entrance face. The vertex distances $l_0$ and $l_1$ are given by the following expressions (from the Kapron article supra):

$$l_0 = \frac{1/m - \cos(\sqrt{AL})}{-n_0\sqrt{A}\sin(\sqrt{AL})} \qquad (3)$$

$$l_1 = \frac{m - \cos(\sqrt{AL})}{-n_0\sqrt{A}\sin(\sqrt{AL})} \qquad (4)$$

In equations (3) and (4), m represents the lateral magnification, that is, the ratio of image size $k_1$ to object size $k_0$, both measured perpendicular to the central axial ray.

$$m = k_1/k_0 \qquad (5)$$

Thus, a single gradient index fiber can produce reduced images (m < 1) and enlarged images (m > 1). [At unity magnification the object and image vertex distances are equal, $l_1 = l_0$ at m = 1.] The total conjugate or perpendicular distance from object plane to image plane is given by $$TC = l_0 + l_1 + L \qquad (6)$$

Figure 2:
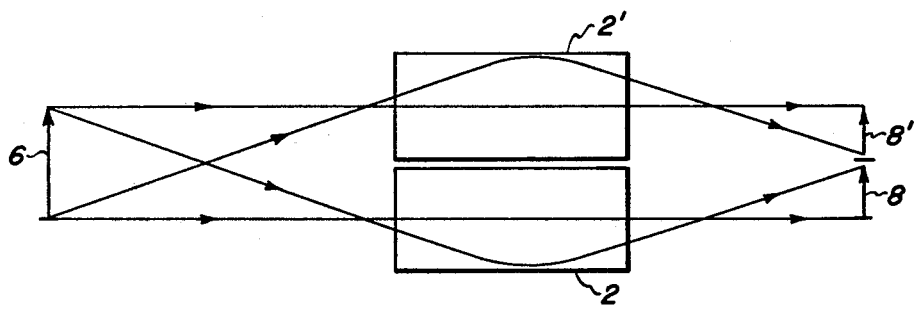
FIG. 2 illustrates two gradient index fibers in parallel orientation forming a non-contiguous reduced image.

Although transmission of a reduced image is therefore possible with a single gradient index fiber, it has heretofore not been possible to form reduced images when a plurality of fiber lenses have been formed together in a lens array. FIG. 2 illustrates the problem associated with forming reduced images with conventional gradient index fiber arrays. Adjacent fibers 2 and 2', by proper selection of parameters, form erect reduced images 8 and 8' of object 6. However, these images are not contiguous. That is, the multiple images do not form a single contiguous reduced image of the single object, the condition necessary for achieving an image of acceptable resolution.

Figure 3:
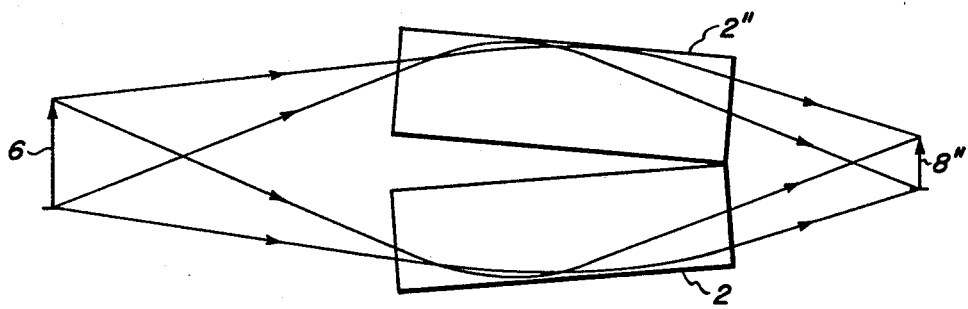
FIG. 3 shows two gradient index fibers tilted with respect to each other to form a single contiguous reduced image according to one aspect of the invention.

As shown in FIGS. 1 and 2, and as practiced heretofore in the aforementioned applications of the bundled array configurations, the fiber axes have been perpendicular to the fiber faces as well as to the object and image planes. It has been found, however, according to one aspect of the present invention, that if the fibers are properly oriented the individual reduced images can be shifted so as to come into approximate conjunction. This basic concept is illustrated in FIG. 3, where fibers 2 and 2" are tilted with respect to the perpendicular axis between the object and image planes. In the ideal case, a single reduced image 8" of object 6 is formed. The effect on the image quality of the departure from this ideal overlap is discussed later in the specification. This discovery of the effect of tilting the fibers with respect to each other led to the assembly of a multiple fiber configuration, or lens array, wherein the axes of fibers at the center of the array are approximately perpendicular to the fiber faces and to an object and image plane but wherein the axes of the remaining fibers increasingly depart from this perpendicular orientation in a prescribed fan-like fashion. Depending upon the parameters selected, the fibers produce overlapping individual images which are resolved into a contiguous reduced image on an image plane.

Figure 4:
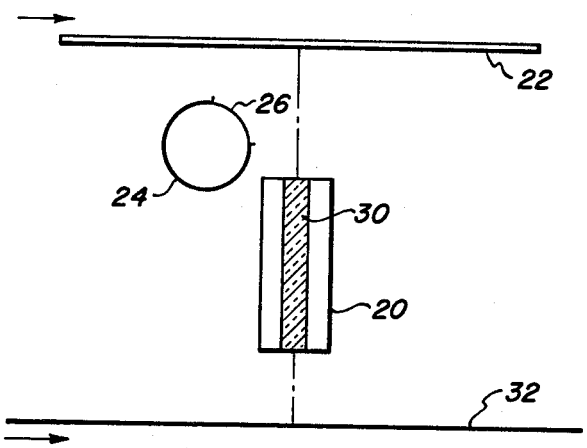
FIGS. 4 and 5 show an end and frontal view respectively of a gradient index reduction lens array in an imaging system.
Figure 5:
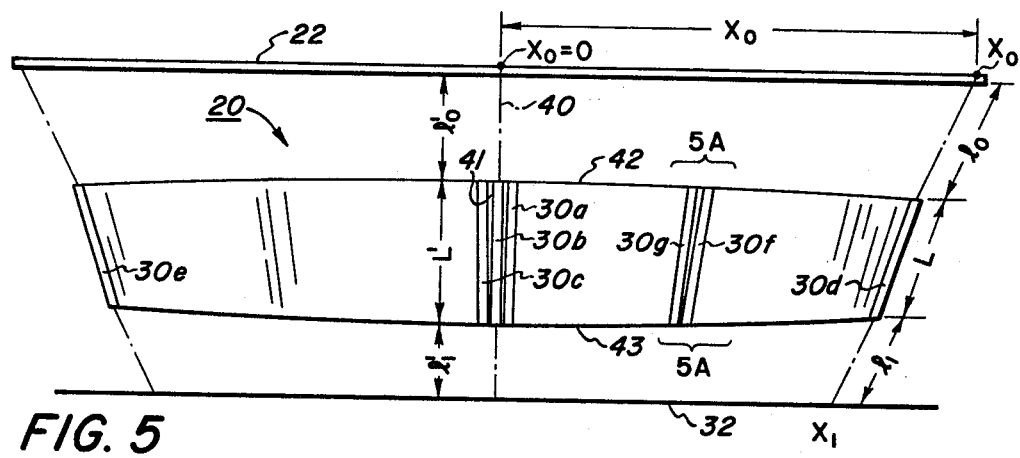

FIGS. 4 and 5 show, in side and front views respectively, a plurality of gradient index fibers assembled together to form a preferred embodiment of a reduction lens array 20. Referring to FIG. 4, object 22 which can be a document located in an object plane is moved past lens 20 in the indicated direction. Lamp 24 provides intense illumination through an aperture 26 onto successive narrow longitudinal strips of the document. Lens array 20 comprises a single row 30 of optical fibers arranged in a manner to be more fully described below. In operation, document 22 is moved past the illuminated area at a speed appropriate to the particular magnification and to the speed of moving imaging plane 32 which can be a photosensitive sheet. Light reflected from document 22 is transmitted by lens array 20 as a reduced image onto sheet 32. The reduced image is formed as a contiguous and overlapping plurality of reduced images from each individual fiber.

Referring to FIG. 5, the arrangement of FIG. 4 is shown in frontal view with the document 22 and image plane 32 traveling into the page. For illustrative purposes, assume that document 22 is an A3 original (width = 297 mm) which is to be reduced to A4 size (210 mm), i.e. lens 20 is a 0.707X lens. Lens 20 comprises a plurality of individual gradient index fibers 30a, 30b, 30c, 30d, 30e, . . . which have the same diameter and axial index of refraction and the same index gradient but which differ, each from the other, in length and in orientation of the fiber axis and orientation of their end faces with respect to the object and image planes and in the orientation of their end faces with respect to their axes. As shown, fiber 30a at the center of the array ($X_0 = 0$) is in vertical orientation, i.e. its axis 40 is perpendicular to the object and image planes which can be a document and a photoreceptor plane, respectively. The axes of adjoining fibers, i.e. 30b, 30c are slightly displaced from the perpendicularity condition, the displacement continuing out to the fibers at the ends of the array. The interfiber displacement value may be a constant value but other values are possible. The spaces 41 between fibers can be filled with a black silicon resin for light absorbing purposes, as is known in the art.

The light ray from the document that passes down the geometrical axis of an endmost fiber 30d (i.e. the central axial light ray for fiber 30d) images document point $X_0 = 148.5$ mm at the reduced photoreceptor point $X_1 = m_0X_0 = 105.0$ mm, where $m_0$ is the desired magnification (0.707). The relationship $X_1 = m_0X_0$ is maintained for the central axial ray passing through each fiber of the array, and the object and image vertex distances ($l_0$, $l_1$) are chosen to provide the correct magnification near the central axial ray of each fiber. These are the basic design principles of the reduction lens array.

The lens assembly, as a whole, lies in a vertical plane which is perpendicular to the object plane but the lens is comprised of a plurality of fibers with a plurality of axes, each axis forming different angles with respect to a line normal to the object plane.

This orientation results in the total conjugate of the light path through each fiber changing from a first value at the center fiber to progressively higher values at the endmost fibers. To accommodate this conjugate change, the lengths of the fibers are progressively decreased from the center outward.

In the preferred embodiment, this is accomplished by assembling original fibers which are of equal length, the original length being longer than the fiber length determined to be necessary for magnification change purposes. Once the fibers are assembled, the fiber lengths are shortened to the desired individual lengths by an initial grinding and/or sawing of both faces followed by a polishing process. The end result is the formation of the two smooth convex faces 42, 43. Two fibers 30f and 30g are shown in enlarged view in FIG. 5a. The dotted portions 44–47 at top and bottom represent portions of the fibers which have been removed during the rough grinding-sawing process. The end faces of the fibers have been polished to smooth surfaces which appear planar but are actually small segments of the convex, and in this example, circular surfaces 42, 43 shown in FIG. 5.

Figure 5A:
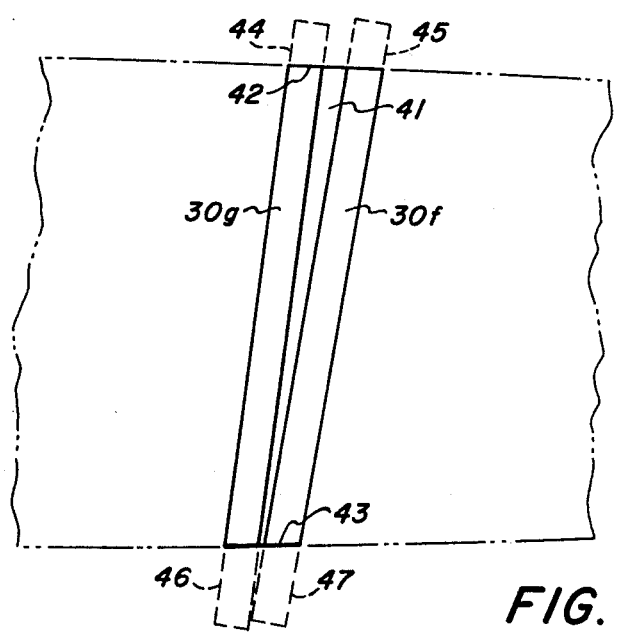
FIG. 5a is an enlarged view of two of the adjoining fibers of the lens array of FIG. 5.

FIG. 5a also shows that the fibers are in approximate contact at face 43 but the invention can also be practiced with a slight displacement at this face. Again, the total displacement between fibers can be maintained as a constant value.

The fact that the fiber end faces are no longer perpendicular to their respective axes has certain ramifications which are explored more fully below.

Figure 6:
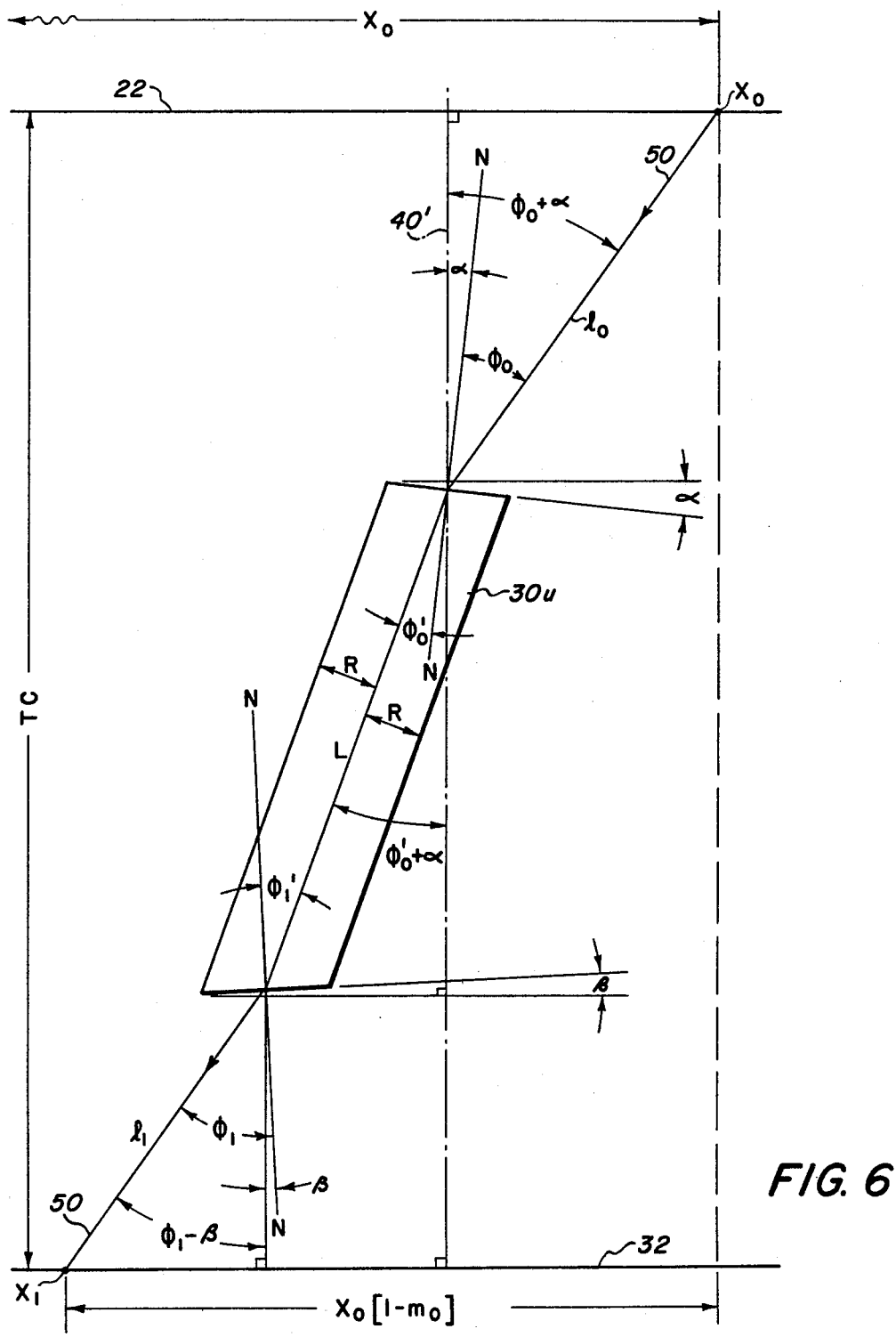
FIG. 6 illustrates the variable parameter of a single optical fiber.

FIG. 6 demonstrates the theoretical aspects of designing the gradient index lens array shown in FIGS 4 and 5. A single gradient index fiber $30u$ is shown, its optical axis tilted with respect to the vertical line $40'$ that is perpendicular to the document and photoreceptor planes 22 and 32. There are 10 variables that specify the geometry of the reduction fiber, viz L, $l_0$, $l_1$, $\phi_0$, $\phi_0'$, $\phi_1$, $\phi_1'$, $\alpha$, $\beta$, m. These variables are determined by solutions of the design equations given below. The solutions will depend on the chosen fiber parameters $n_0$, $\sqrt{A}$, R and optical system parameters $m_0$, TC and the maximum $X_0$.

Consider a given point $X_0$ on a document specified by its distance $X_0$ from the center of the document. A particular light ray 50 emanating from document point $X_0$ strikes the fiber entrance face on the fiber axis, the ray making an angle $\phi_0$ relative to the normal (N) to the fiber face. The ray is refracted (angle $\phi_0'$) and travels straight down the fiber axia. At the fiber exit face, the ray is refracted (angle $\phi_1$) and strikes the photoreceptor plane at point $X_1 = m_0 X_0$ a reduced distance $(m_0 X_0)$ from the center. Here $m_0$ is the desired machine magnification. This central axial light ray is the only image-forming ray that does not travel in a sinusoidal path within the fiber. The object vertex distance $l_0$ and image vertex distance $l_1$ are chosen to satisfy Equations (3) and (4) in the reduction configuration (m<1) or enlargement (m>1). The transverse magnification, m, given by Equation (5), is related to the machine magnification $m_0$ by $$m = m_0 \frac{\cos(\phi_1 - \beta)}{\cos(\phi_0 + \alpha)} \quad (7)$$

for points near the central axial ray. The small angles $\alpha$, $\beta$ are included in order that the required convex shape of the fiber array can be achieved with smooth surfaces. [It should be noted that the convex shape reflects the fact that the vertical height of the array, L cos $(\phi_0' + \alpha)$, decreases from the center to the edges of the array if the axial magnification $m_0$ is to be the same for each fiber. It is possible to relax this latter requirement, thereby obtaining a reduction array with either or both flat (non-convex) surfaces, but having varying magnification and reduced image quality. Such configurations are described below in connection with FIG. 13b.]

For ease of manufacturing, the convex surfaces of the array are chosen to be arcs of circles whose centers of curvature lie on the symmetry axis 40 in FIG. 5. Thus, the angles $\alpha$, $\beta$ of each fiber are designed to satisfy the following equations:

$$\tan \alpha = \frac{2X_2[l_0 \cos(\phi_0 + \alpha) - l_0']}{X_2^2 - [l_0 \cos(\phi_0 + \alpha) - l_0']^2}$$

where $X_2 = X_0 - l_0 \sin(\phi_0 + \alpha)$ and (8)

$$\tan \beta = \frac{2X_3[l_1 \cos(\phi_1 - \beta) - l_1']}{X_3^2 - [l_1 \cos(\phi_1 - \beta) - l_1']^2} \quad (9)$$

where $X_3 = X_0 - l_0 \sin(\phi_0 + \alpha) - L \sin(\phi_0' + \alpha)$ and where $l_0$ and $l_1$ are the object and image vertex distances given by Equations (3) and (4), and $l_0'$, $l_1'$ are the corresponding vertex distances for the central fiber ($X_0 = 0$). Equations (3), (4), (7), (8), (9) relate the 10 fiber variables. Thus, five additional design equations for the reduction fiber are required. For any $X_0$, the vertical distance between the parallel document and photoreceptor planes must equal the total conjugate, TC, at $X = 0$. Thus, applying Equation (6) to this configuration, $$TC = l_0 \cos(\phi_0 + \alpha) + \cos(\phi_0' + \alpha) + l_1 \cos(\phi_1 - \beta)$$
tm (10)

As described above, the axial ray 50 in FIG. 6 reduces a distance $X_0$ on the document to a distance $(m_0 X_0)$ on the photoreceptor. Thus, the amount of reduction is given by $$X_0(1 - m_0) = l_0 \sin(\phi_0 + \alpha) + L \sin(\phi_0' + \alpha) + l_1 \sin(\phi_1 - \beta) \quad (11)$$

Of course, the angles $\phi_0$, $\phi_0'$, $\phi_1$, $\phi_1'$, are all functions of the field point $X_0$. These angles are related by the final three design equations:

$$\sin \phi_0 = n_0 \sin \phi_0' \quad (12)$$

$$\sin \phi_1 = n_0 \sin \phi_1' \quad (13)$$

$$\phi_1' - \beta = \phi_0' + \alpha \quad (14)$$

Finally, the 10 design equations (3), (4), (7)-(14), may be solved simultaneously for the 10 variables, namely L, $l_0$, $l_1$, $\phi_0$, $\phi_0'$, $\phi_1$, $\phi_1'$, $\alpha$, $\beta$, m. Typically, the previous 10 design equations are used to design the end-most fiber in the array. The resulting values of $X_0$, $l_0$, L, $\phi_0$, $\phi_0'$, $\alpha$, and $\beta$ for the end-most fiber are then substituted into equations (15) and (16) below to determine the radii of curvature $R_1$ and $R_2$ of the fiber array faces 42 and 43 respectively.

$$R_1 = \frac{X_0 - l_0 \sin(\phi_0 + \alpha)}{\sin \alpha} \quad (15)$$

$$R_2 = \frac{X_0 - l_0 \sin(\phi_0 + \alpha) - L \sin(\phi_0' + \alpha)}{\sin \beta} \quad (16)$$

These values of $R_1$ and $R_2$ are then held constant in designing the remaining fibers of the array. For these remaining fibers, design equations (15) and (16) are used in place of equations (8) and (9). The derived values of the 10 variables constitute a design for the fiber whose axial ray connects object point $X_0$ and the photoreceptor point $(X_1 = m_0 X_0)$. Thus, the remaining fibers of the reduction array are designed by solving the design equations (3, 4, 7, 10–15) for a set of suitably chosen object field (document) points including the central point $X_0 = 0$. Since the array is symmetric about $X_0 = 0$, only ½ of the total number fibers must be designed.

If only central axial rays are considered, then the reduction lens designed by the present technique will properly "image" the given array of field points at a reduced array of photoreceptor points $m_0 X_1$, $m_0 X_2$, ..., $m_0 X_n$. Of course, a continuum of rays define the actual reduced image. For any given object field point, other axial rays and off axis rays through all fibers having fields of view that include the object field point will contribute. Off axis magnification variations, considered below, will be important in determining the quality of the reduced image. In addition, aberrations within the individual fibers and aberrations due to the tilted end faces will degrade the image to some extent. Using analytical techniques, it is possible to predict the image quality (MTF) for a particular reduction lens array design. If the resulting image quality is unacceptable, the input parameters e.g. $\sqrt{A}$, TC, may be varied in a systematic fashion to generate an acceptable design.

The quality of the reduced image depends on the aberrations of the individual fibers, the magnification variation over the field of each fiber, and the overlap of images from several neighboring fibers. Conventional, gradient index fibers used in SELFOC arrays are nearly diffraction limited in their performance. Typical point spread functions are of width 25 microns, yielding near unity MTF up to 20 line pairs/mm. The depth of focus of such a single, conventional fiber is several milimeters. On the other hand, ray trace analysis of the reduction fibers reveals that the tilted end faces cause spot growth in the direction of the linear array (X direction). For large fiber end face tilts, the point spread can increase ten-fold in the array direction, with a corresponding reduction of MTF for object lines oriented perpendicular to the array. Since the end face tilt causes only slight spreading in the direction perpendicular to the array, the high MTF is maintained for object lines, oriented parallel to the array. The point spread in the array direction is found to increase strongly with fiber end face tilt. Thus, the image quality can be maintained at an acceptable level by limiting the tilt angles. This can be achieved by either increasing the total conjugate or decreasing the width of the object field. In the example given below, a total conjugate of 100 mm and field width of 297 mm are seen to yield satisfactory image quality.

Figure 7:
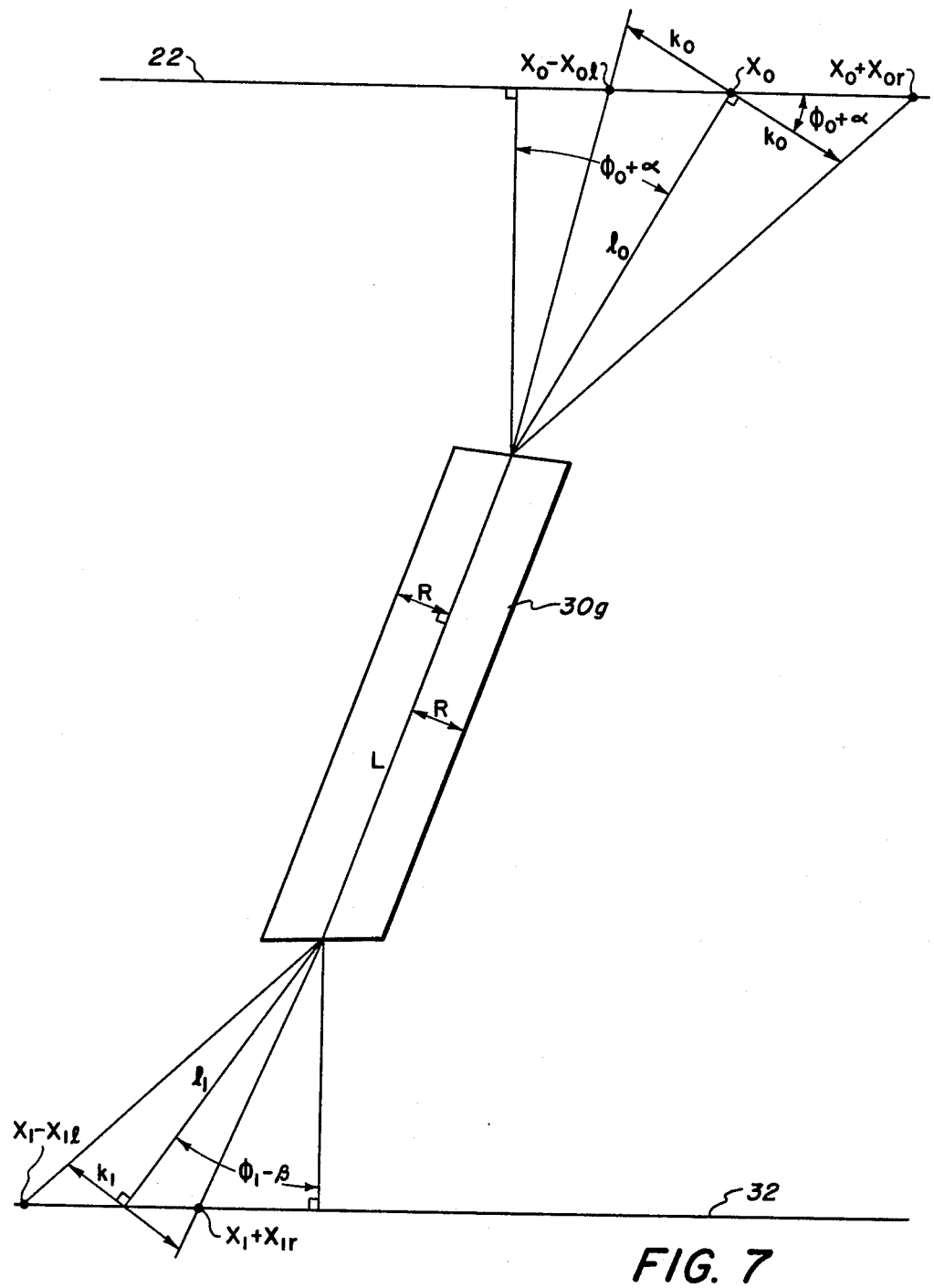
FIG. 7 illustrates the off-axis magnification variation of a single fiber.

Next consider the off axis magnification variation of a single, tilted, reduction fiber 30g shown in FIG. 7. The angular field of view of the reduction fiber, centered about the tilted axial ray, is of magnitude $k_0/l_0$, where $l_0$ is given by Equation (3) and the maximum transverse object field height is $$k_0 = \frac{-R}{\sin(\sqrt{AL})} \sqrt{(1/m - \cos\sqrt{AL})^2 + (\sin\sqrt{AL})^2} \quad (17)$$

Note, however, that $k_0$ is tilted at an angle of $(\phi_0+\alpha)$ with respect to the documents to be imaged. Thus the region of the document that is imaged by the reduction fiber extends from $(X_0-X_{0l})$ to $(X_0+X_{0r})$ where $X_0$ is the position specified by the central axial ray 50. The transverse image field $k_1=mk_0$ is also rotated with respect to the photoreceptor, at an angle $(\phi_1-\beta)$. Furthermore, the aerial image (not shown) is slightly rotated with respect to the photoreceptor, and slightly curved due to the fact that the longitudinal magnification is the square of the transverse magnification (m). In practice, with non-inverting lens systems, it is found that the excursion of the aerial image from the photoreceptor plane is very small, well within the depth of focus of the reduction array, and thus may be safely ignored.

When the aerial image is projected onto the photoreceptor, it is seen to extend from $(X_1-X_{1l})$ to $(X_1+X_{1r})$ where $X_1$ is the image position specified by the central axial ray. The machine magnification is the ratio of an image height measured in the photoreceptor plane to an object height in the document plane:

$$m_0 = X_1/X_0 \quad (18)$$

Thus, the machine magnification at the right edge of the field of view of the reduction fiber is $$m_{0r} = X_{1r}/X_{0r} \quad (19)$$

and the magnification at the left edge of the field is $$m_{0l} = X_{1l}/X_{0l} \quad (20)$$

Now the distances may be expressed in terms of the fiber parameters as follows:

$$X_{0r} = \frac{k_0 \sec(\phi_0 + \alpha)}{1 - \frac{k_0}{l_0}\tan(\phi_0 + \alpha)} \quad (21)$$

$$X_{0l} = \frac{k_0 \sec(\phi_0 + \alpha)}{1 + \frac{k_0}{l_0}\tan(\phi_0 + \alpha)} \quad (22)$$

$$X_{1r} = \frac{k_1 \sec(\phi_1 - \beta)}{1 + \frac{k_1}{l_1}\tan(\phi_1 - \beta)} \quad (23)$$

$$X_{1l} = \frac{k_1 \sec(\phi_1 - \beta)}{1 - k_1/l_1 \tan(\phi_1 - \beta)} \quad (24)$$

Figure 8:
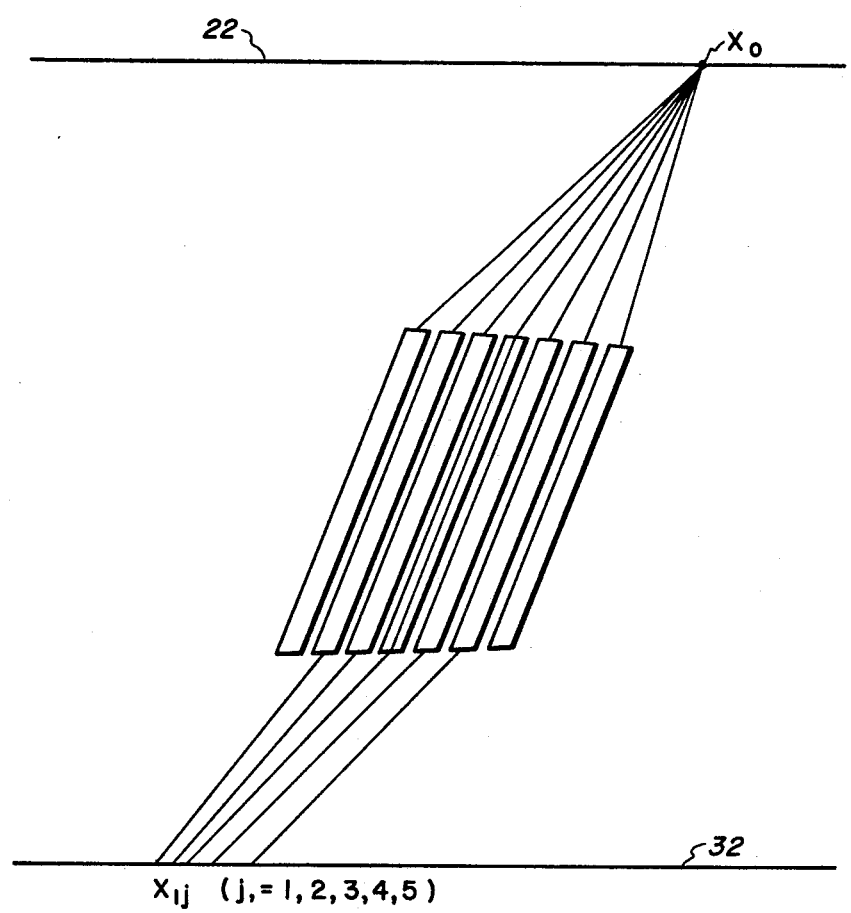
FIG. 8 illustrates the imaging of an object point by five fibers located toward one end of an array.

It is worth mentioning the formula for the machine magnification on the axial ray $m_0$ in Equation (7) is obtained from $m_{0r}$ or $m_{0l}$ by taking the limit of either expression as $k_0$, $k_1 \to 0$ while the ratio $k_1/k_0 = m$, the traverse magnification. In general $m_{0r} \neq m_{0l}$, and the magnification varies across the field of a given fiber. An important consequence of this variation is that neighboring fibers will produce multiple images of a single point object. The formation of multiple images as a consequence of the magnification variation over the fields of the individual fibers is illustrated in FIG. 8. In this figure, $X_0$ is the intersection of the central axial ray of the central fiber with the document plane. Although seven fibers are shown, only five fibers contribute to the image of $X_0$. The actual number of fibers which so contribute will vary dependent on system parameters. The magnitude of the effect shown has been greatly exaggerated for clarity. It is obvious that this effect will degrade the image quality. The effect can be limited and acceptable image quality achieved by parameters used in the following example.

EXAMPLE

To form the 0.707 reduction imaging system shown in FIGS. 4 and 5, 203 gradient index fibers of initial lengths of $\geq 43$ mm are assembled in a one row configuration. The fiber end faces are ground and polished to a circular surface. The radius of curvature of surface 42 is 4.2 meters and the radius of curvature of surface 43 is 8.5 meters. Each fiber has an axial refractive index ($n_0$) of 1.537, a gradient constant $\sqrt{A}=0.086$ mm$^{-1}$ and a radius R of 0.5 mm. The object-to-lens vertex distance $l_0$ at the center is 33.908 mm, the center fiber 30a has a length L of 42.723 mm and the lens to image vertex distance $l_1$ is 23.369 mm for a total center conjugate of 100.00 mm. This distance between object and image planes, of course, remains a constant even at the ends of the array but the total conjugate of the individual end fibers 30d, 30e increases to 109.797 mm; $l_0$ increases to 40.370 mm, L decreases to 41.791 mm and $l_1$ increases to 27.636 mm. The axis of each of the end fibers 30d, 30e are at an angle $\phi$ of 17.83° with respect to the normal to the document and image plane.

In order to demonstrate the calculation of image quality for a given reduction lens design, assume that the five contributing fibers shown in FIG. 8 are at the end of an array. The parameters of these fibers are listed in Table 1 for an exemplary design. The first column lists the intersection point of the central axial rays of each fiber with the document plane. The second column lists an object point $X_0 = 148.5$ mm. The next seven columns give fiber parameters. The last column is the image position $X_{1j}$ of the image produced by each fiber, of the point object at $X_0 = 148.5$ mm.

Figure 9:
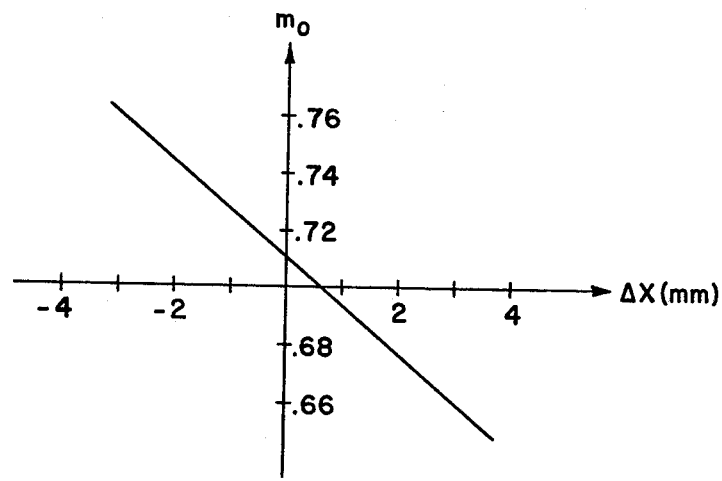
FIG. 9 is a graph plotting magnification for various off-axis object positions.
Figure 10:
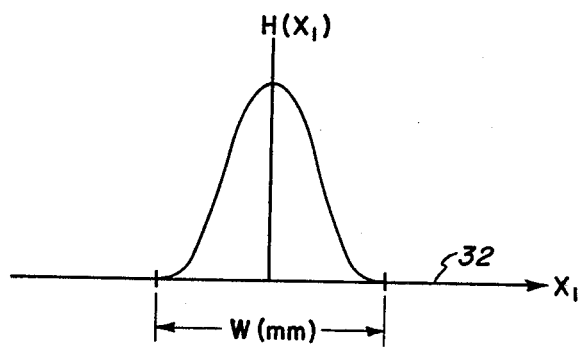
FIG. 10 is a graph showing total irradiance distribution in the image of a point object.

The varying image position is a consequence of the off-axis magnification variation of each fiber. This variation has been plotted for example in FIG. 9 for the $X_0 = 148.5$ mm fiber. In this figure, $\Delta X$ is the distance in the object plane measured from the position of the central axial ray. Note that the magnitude of the extreme variation of $m_0$ is $\pm 7\%$. With reference to Table 1, this yields a total variation in image position of 0.15 mm, which is of the order of the individual point spreads due to the tilted end faces. There are only 4 images points listed in Table 1 since $X_0 = 148.5$ is out of the field of view of the last fiber (for which $X_0 - X_{0l} = 151.5 - 2.9 = 148.6$). The irradiance at each image point is weighted according to the "rule of ellipse" (described in an article by Rees and Lama entitled "Some Radiometric Properties of Gradient Index Fiber Lenses" published in the April 1980 issue of Applied Optics, Vol. 19, No. 7, pp. 1065–1069). Additionally, the images of the point object are spread by approximately 0.2 mm due to the end face tilt. Then the total irradiance distribution $H(X_1)$ in the photoreceptor 32 is shown in FIG. 10. This is the distribution in the image of a point object, that is, the point spread function. Its Fourier transform gives the MTF. For the case considered,

| W | MTF | Frequency | Spectrum |
| --- | --- | --- | --- |
| 0.35mm | 40% | 2.9 line pairs/mm | narrowband light |
| 0.50mm | 40% | 2.0 line pairs/mm | broadband light (300 nm spectral width) |

This is a worst case example, since it included the five most extremely tilted fibers in the array. The image quality in the center of the array will be considerably better.

The designed fiber parameters listed in Table 1 are meant to be exemplary, and do not necessarily constitute an optimum design. For instance, with 0.5 mm radius fibers, the interfiber spacing at the top of the array for the fibers listed in Table 1 varies from 0.2 mm to 0.3 mm. The interfiber spacing at the bottom of the array also varies, from 0.15 mm to 0.2 mm. For ease of manufacturing, it may be desired to maintain a fixed interfiber spacing at the top of the array and another fixed spacing at the bottom (say 0.30 mm at top, 0.17 mm at bottom) or equal angular increments $(\phi'_0 + \alpha)$. This end may be achieved by design, by inputting a different set of axial object points $(X_0)$ in the design equation. Also, it may be desired to increase the image exposure by increasing the fiber radii. Or, it may be desired to increase the image quality by increasing total conjugate or decreasing A.

TABLE 1

| Axial Point | $X_0$ | L | $l_0$ | $l_1$ | $\phi_0$ | $\phi_1$ | $\alpha$ | $\beta$ | $X_{1j}$ |
| --- | --- | --- | --- | --- | --- | --- | --- | --- | --- |
| 145.5 | 148.5 | 41.850 | 39.890 | 27.325 | 24.658 | 28.230 | 1.497 | 0.679 | 104.85 |
| 147.0 | 148.5 | 41.836 | 40.008 | 27.402 | 24.887 | 28.485 | 1.505 | 0.684 | 104.88 |
| 148.5 | 148.5 | 41.821 | 40.127 | 27.481 | 25.113 | 28.728 | 1.514 | 0.683 | 105.00 |
| 150.0 | 148.5 | 41.806 | 40.247 | 27.558 | 25.293 | 28.980 | 1.525 | 0.689 | 104.92 |
| 151.5 | 148.5 | 41.791 | 40.370 | 27.636 | 25.554 | 29.233 | 1.537 | 0.692 | out of field |

Note: Dimensions are in mm; angle values in degrees.

FIG. 11 shows the 0.707 reduction lens array of FIGS. 4 and 5 utlized in the optical system of a multi-magnification copying system. Document 62 is placed on platen 64 adapted to move past a narrow illumination strip 66 which is brightly illuminated by apertured lamp 68 acting in combination with reflector 70. The imaging system comprises a 100 mm total conjugate gradient index lens array 72 which transmits an image at unity magnification and the 0.707X reduction lens array 20 described above connected to array 72. Shutter 74 is adapted to move in the direction indicated or, alternately may remain stationary and means (not shown) may move the appropriate lens array into transmitting position.

In operation, platen 64 is moved through the illuminated area and light impinging on a narrow longitudinal strip of the document is reflected towards the lens combination. Since the shutter 74 is covering lens array 20, lens array 72 transmits the reflected image, at unity magnification onto the photosensitive surface 76 of a drum 78 rotating at the same speed as the platen. Surface 76 previously receiving an electrostatic charge at station C is then exposed in image wise fashion. The latent image is developed at development station E by application of toner material of appropriate polarity. The developed image is brought into contact with support sheet 80 within a transfer station F and the toner image is electrostatically attracted from the surface 76 to the contacting side of the support sheet. Any residual toner particles remaining on the surface 76 after the completion of the transfer operation are removed within a cleaning station G, placing the surface in a condition to repeat the process. After the transfer operation, the image bearing support sheet is forwarded to a fusing station H via a suitable conveyor.

If a magnification change to 0.7X is desired, shutter 74 is moved to the right to block lens array 72 and open up lens array 20 and the platen scan speed is adjusted accordingly.

Although only two lens arrays are shown in the optical system of FIG. 11, it is apparent that additional lens arrays designed to accomplish different magnification, according to the previously enunciated principles, could be added to the combined arrays. And although the lens array 20 has heretofore been represented as accomplishing reduction, the lens array 20 could produce enlarged images as well. For example, if the lens array assembly (consisting of arrays 72 and 20) of FIG. 11 were rotated to the position shown in FIG. 12, lens array 20 would then operate as a 1.414X enlarging lens array, while lens array 72 would continue to operate as a 1X lens array. The axis of rotation 81 is located in the center of the 1X lens array equidistant from both end faces.

Figure 13A:
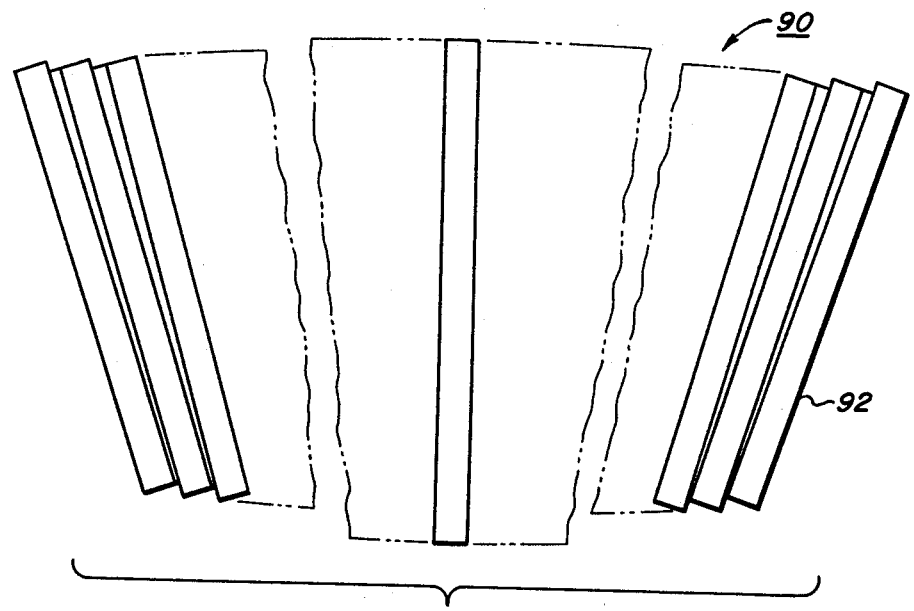
FIGS. 13a and 13b illustrate a second and third possible lens array end surface configuration.

Although the reduction lens embodiment shown in FIGS. 4 and 5 preferably had convex end faces, other configurations are possible consistent with the principles of the invention. A first example is shown in FIG. 13a. In this embodiment, lens array 90 is again formed of a single row of gradient index optical fibers 92. However, in this embodiment, each fiber has been found at the required length prior to assembly. The fibers are then joined together in characteristic fan-like fashion with the required system parameters to achieve desired magnification. In this embodiment, the fiber faces are square ended and assume a jagged or sawtooth configuration as contrasted with the smooth surface of the FIGS. 5–5a embodiment.

Figure 13B:
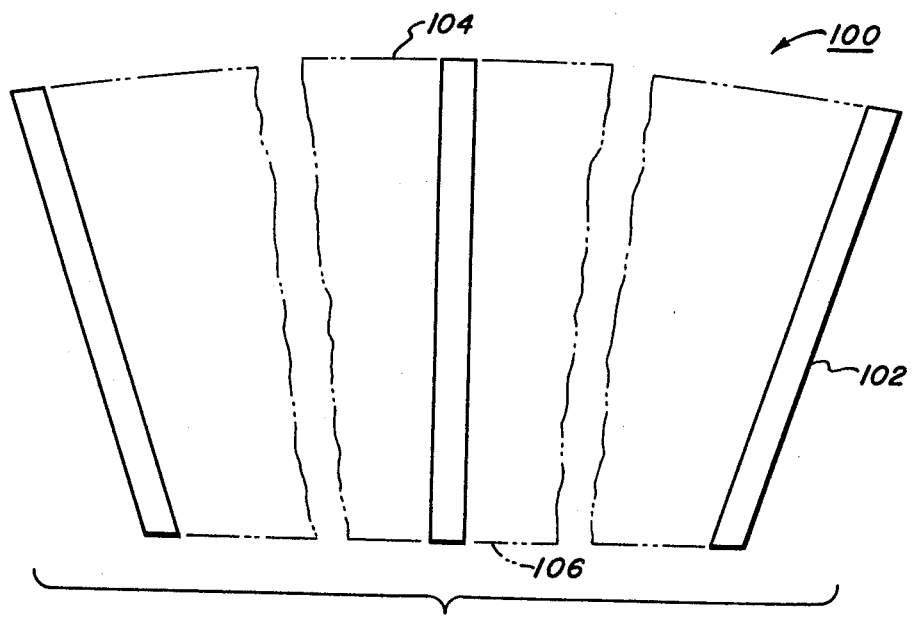

In FIG. 13b, lens array 100 has a single row of fibers 102. In this configuration, only one face 104 has been formed with a convex surface. The opposite face 106 has been simply formed as a planar surface. There are also other possibilities; e.g. for the embodiments of FIGS. 5 and FIG. 13b the convex surfaces could be spherical instead of cylindrical. Also, both surfaces of FIG. 13b could be planar or the top surface planar and the bottom convex.

Although, the lens embodiment shown in FIGS. 4 and 5 utilized a single row of gradient index fibers, various 2 row arrays may be used consistent with the principles of the present invention in systems with different exposure and exposure modulation requirements.

FIG. 14 illustrates, in end views, two-row variants of the array of FIGS. 4 and 5. In FIG. 14a, lens array 110 consists of the two rows of fibers 12 tilted so as to adjoin one another at the imaging face. This configuration would lead to increased overlap of reduced images produced by each row but would require more exacting manufacturing operations. FIG. 14b shows a second variant of the two row array where lens 114 comprises 2 rows 116 separated by a distance greater than $2k_0$ so that the images from the separate rows do not overlap. Finally, FIG. 14c shows another two row reduction array 118 where rows 120 are joined in side by side relationship. Some amount of image degradation, which may be tolerable will result.

In conclusion, it may be seen that there has been disclosed herein a novel optical imaging system. The exemplary embodiments described herein are presently considered to be preferred; however, it is contemplated that further variations and modifications with the purview of those skilled in the art can be made herein. As examples, the scanning system of FIG. 11 could be adapted so that the platen and document remain stationary and the lens array assembly moves to transmit the image onto a flat photoreceptor. Also, the lens arrays may comprise a greater number of fiber rows depending on optical requirements of the particular system. The following claims are intended to cover all such variations and modifications as fall within the true spirit and scope of the invention.

We claim:

1. In an optical system for transmitting an image of an object lying in an object plane onto an image plane at a magnification other than unity, a lens array comprising a plurality of gradient index optical fibers bound together in side by side relationship, the fibers arranged so that those in the center of the array have their axes substantially perpendicular to the object and image plane while adjoining fibers are progressively tilted in fan-like fashion towards the ends of the array so that their axes increasingly depart from said substantially perpendicular orientation, said fibers having lengths which vary from the center of the array out to the ends, the fibers in the array center being of maximum length while adjoining fibers progressively decrease in length out to the ends of the array whereby each fiber end is separated from the object and image plane by prescribed distances chosen to provide the required magnification.

2. The optical system of claim 1 wherein the lens array has one face which is longer relative to the other face.

3. The optical system of claim 2 wherein the shorter face of said array faces the image plane resulting in the fibers transmitting contiguous overlapping images of said object which are resolved into a reduced image on said image plane.

4. The optical system of claim 2 wherein the shorter face of said array faces the object plane resulting in the fibers transmitting contiguous overlapping images of said object as an enlarged image onto said image plane.

5. The optical system of claim 2 wherein at least one of said faces has a convex surface.

6. The optical system of claim 5 wherein said convex surface is formed as an arc of a circle having a center of curvature on the symmetry axis.

7. The optical system of claim 2 wherein at least one of said faces is spherical.

8. The optical system of claim 2 wherein at least one of said faces is planar.

9. The optical system of claim 2 wherein both faces of said array have fiber ends which are perpendicular to the fiber axes.

10. The optical system of claim 2 wherein both faces of said array have fiber ends which are not perpendicular to the fiber axes.

11. The optical system of claim 1 wherein said fibers have an interfiber spacing in a horizontal plane passing through the array which is a constant value.

12. The imaging system of claim 1 wherein said lens array comprises at least a single row of fibers.

13. The imaging system of claim 1 wherein said lens array comprises a double staggered row of fibers, fibers in adjoining rows being substantially parallel to each other.

14. The imaging system of claim 13 wherein said two rows are separated by a distance that is equal to or greater than $2 k_0$, the maximum transverse field dimension of a single fiber.

15. The imaging system of claim 1 wherein said lens array comprises a double staggered row of fibers, fibers in adjoining rows being arranged in a non-parallel configuration.

16. An imaging system for a multi-magnification copier wherein a document on an object plane is reproduced on a photosensitive image plane at a selected magnification including a lens array assembly comprising:

a first gradient index lens array positioned between the object and image plane, to transmit an image of said document onto said image plane at a first magnification, at least a second gradient index lens array positioned between the object and image planes, said lens array adapted to transmit an image of said document onto said image plane at a second magnification, at least one of said arrays comprising a plurality of gradient index optical fibers bound together in side by side relationship, the fibers arranged so that those in the center of the array have their axes substantially perpendicular to the object and image planes while adjoining fibers are progressively tilted in fan-like fashion towards the ends of the array so that their axes increasingly depart from said substantially perpendicular orientation, said fibers having lengths which vary from the center out to the ends, the fibers in the array center being of maximum length while adjoining fibers progressively decrease in length out to the ends of the array whereby each fiber end is separated from the object and image plane by prescribed distances chosen to provide the required magnification, means for providing relative movement between document, lens array assembly and image plane for the selected magnification, means for illuminating a narrow longitudinal strip of said document, and means for preventing transmission of said document image through a selected one of said lens arrays whereby light reflected from said document is transmitted through said other array in the particular magnification onto the image plane.

17. The imaging system of claim 16 wherein said first lens array transmits an image of said document at unity magnification.

18. The imaging system of claim 17 wherein said second lens array transmits an image of said document at a reduced magnification.

19. The imaging system of claim 18 wherein said second lens array has smooth convex end faces.

20. The imaging system of claim 17 wherein said second lens array transmits an image of said document at an enlarged magnification.

21. In an optical imaging system, a gradient index lens array for transmitting an image at a magnification of other than unity, comprising a plurality of gradient index optical fibers bound together in side by side relationship, each fiber having an axis which is substantially nonparallel to the axes of adjoining fibers and each fiber having a length which varies from the center out to the ends, the fibers in the array center being of maximum length while adjoining fibers progressively decrease in length out to the ends of the array each fiber end being separated from the object and image plane by prescribed distances chosen to provide the required magnification whereby the fibers transmit overlapping individual images of an object which are resolved into a contiguous reduced image on an image plane.

22. In an optical system for transmitting an image of an object lying in an object plane onto an image plane at a magnification other than unity, a lens array comprising a plurality of gradient index optical fibers bound together in side by side relation, the array characterized by:

the fibers being oriented in an open-fan type of construction so that the fibers in the center of the array have their axes substantially perpendicular to the object and image planes while adjacent fibers are progressively displaced from said center fibers in a static pivoting fashion so that their axes increasingly depart from said substantially perpendicular orientation, each fiber having a length which varies from the center out to the ends, the fibers in the array center being of maximum length while adjoining fibers progressively decrease in length out to the ends of the array each fiber end being separated from the object and image plane by prescribed distances chosen to provide the required magnification whereby the lens array has one face which is relatively longer than the other face.

23. A method for forming a gradient index lens array capable of transmitting an image of an object at an object plane onto an image plane at a magnification other than unity comprising the steps of selecting the desired magnification ratio, joining together a plurality of gradient index fibers of first length into at least one row, the fibers adjoining a centrally located fiber oriented so that their axes are progressively displaced outward towards the end of the row in relation to the axis of the center fiber which has an axis perpendicular to said object and image planes, determining the proper lens to object vertex distance ($l_0$) and lens to image vertex distance ($l_1$) for each fiber, reducing the length of each individual fiber to obtain the $l_0$, $l_1$ required distances.

24. The method of claim 23 wherein the extension of said fiber axes have a common point on the symmetry axis of the lens array and the angle subtended between adjoining fibers is constant.

* * * * *

UNITED STATES PATENT AND TRADEMARK OFFICE
CERTIFICATE OF CORRECTION

PATENT NO. : 4,331,380

DATED : May 25, 1982

INVENTOR(S) : JAMES D. REES, et al.

It is certified that error appears in the above-identified patent and that said Letters Patent are hereby corrected as shown below:

Col. 6, line 12, delete "tm".

Col. 7, line 20, change "filts" to --tilts--.

Col. 8, line 55, change " $\geqq$ " to -- $\geq$ --.

Col. 11, line 15 change "found" to --formed--; line 39 change "12" to --112--.

Signed and Sealed this

Twenty-first Day of September 1982

[SEAL]

Attest:

GERALD J. MOSSINGHOFF

Attesting Officer  Commissioner of Patents and Trademarks